Nov. 28, 1967

R. HANNA 3,355,156

CONTROL SYSTEM

Filed June 14, 1965

INVENTOR.
RALPH HANNA

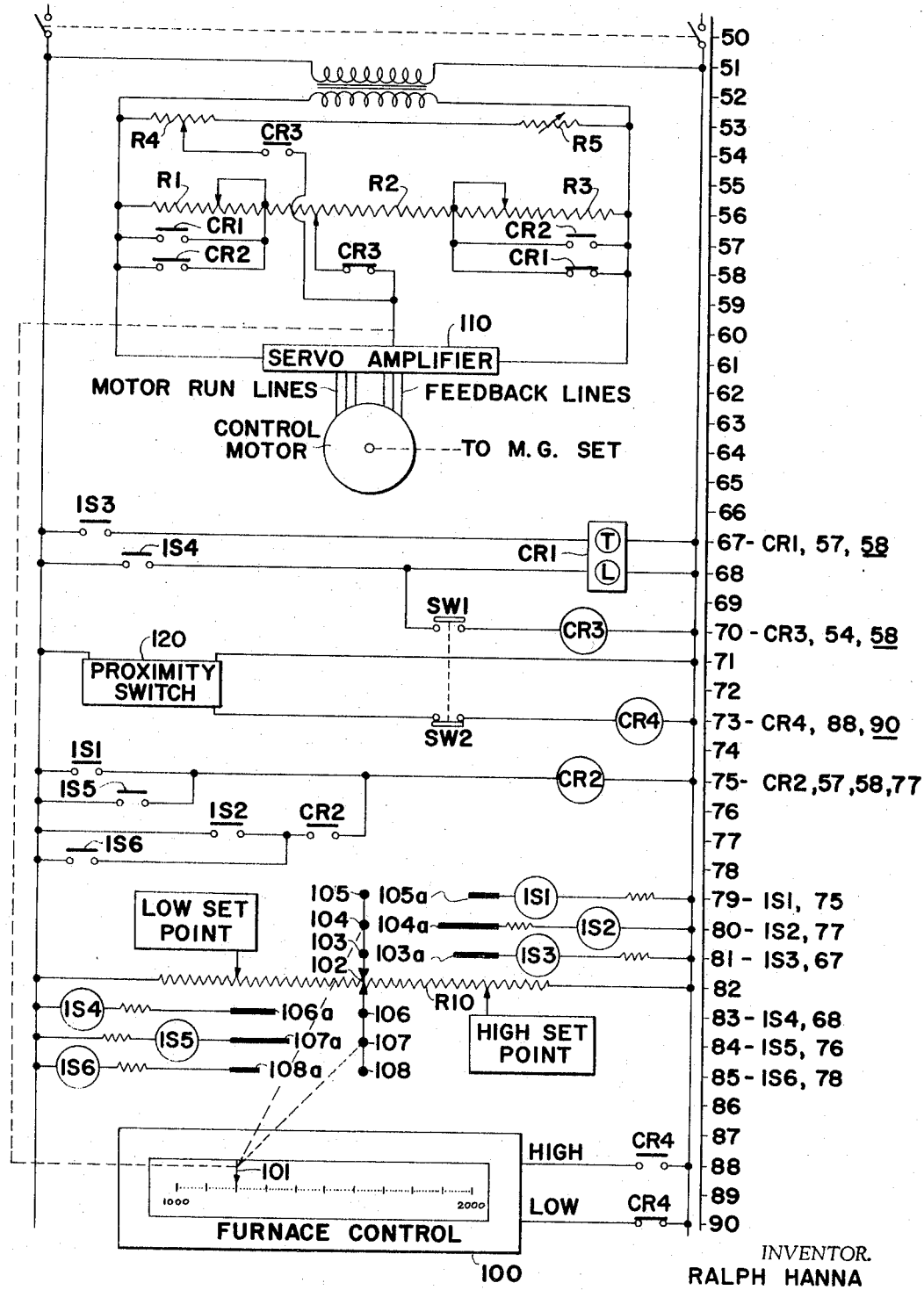

United States Patent Office 3,355,156
Patented Nov. 28, 1967

3,355,156
CONTROL SYSTEM
Ralph Hanna, Toledo, Ohio, assignor to Midland-Ross Corporation, Toledo, Ohio, a corporation of Ohio
Filed June 14, 1965, Ser. No. 463,486
14 Claims. (Cl. 263—3)

ABSTRACT OF THE DISCLOSURE

Apparatus for heating or cooling material by passing the material through the apparatus, changing the internal temperature of the apparatus from a first level to a second level, and controlling the speed of the material through the apparatus in response to the internal temperature. Means are shown for selecting the two temperature levels and for further modifying the speed of the material through the apparatus as the internal temperature changes from one level to the other level. A manual speed control may be enabled at one temperature level and disabled above that one level.

---

Figure 1:
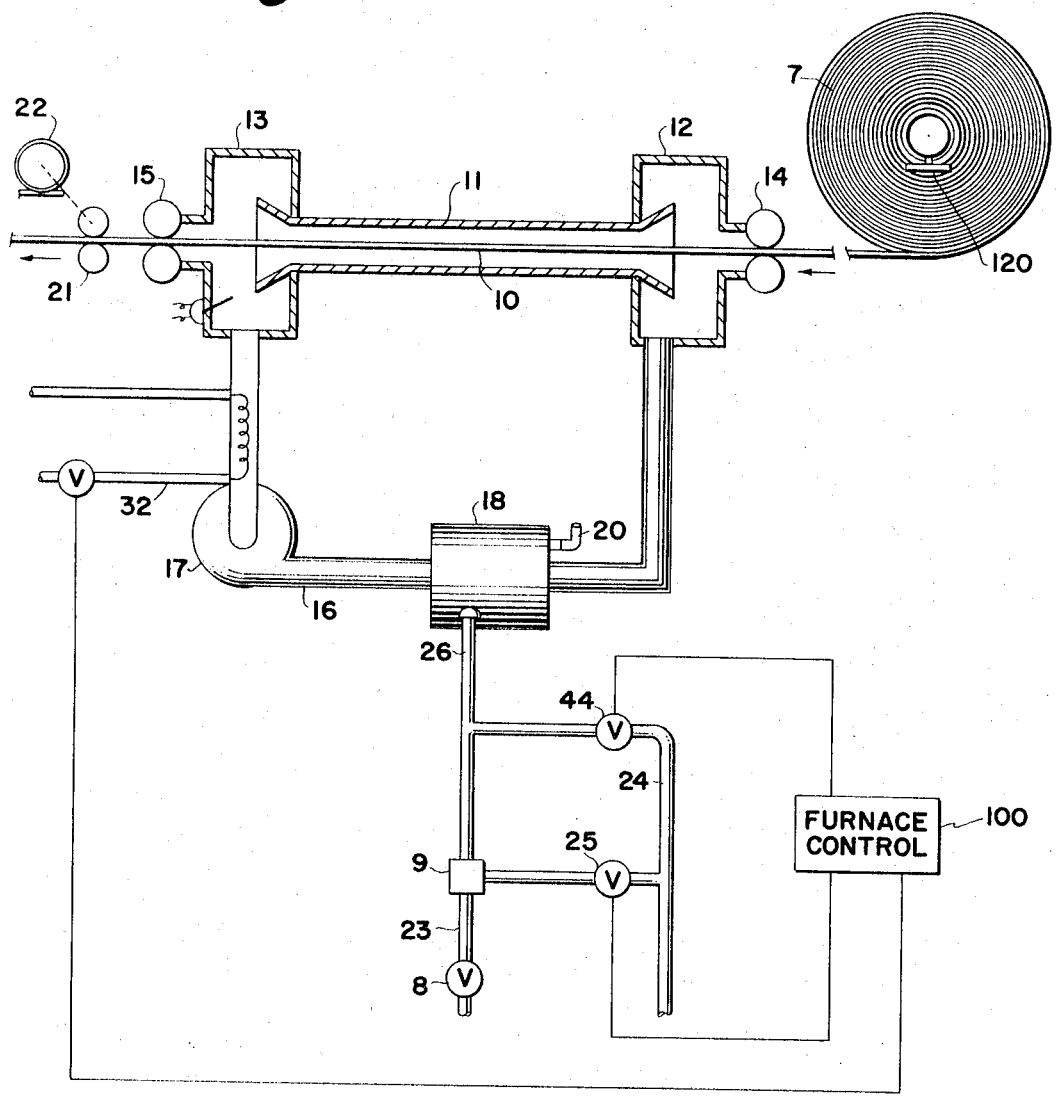

This invention relates to control apparatus in general and, in particular, to a control system for apparatus adapted to have material pass therethrough for heating or cooling. The invention is described in connection with equipment relating to the heating of relatively thin material such as steel, brass or aluminum in strip form by passing a strand thereof through a duct which constitutes a convection heating zone, and circulating through the duct at high velocity a stream of gas, preferably an atmosphere which will protect the surface of the metal being heated, the gas being at a temperature considerably in excess of the final desired work temperature.

Convection heating of metal strip by application thereto of high velocity streams of gas whose temperature is relatively high is hereafter referred to as high heat head convection heating of strip. In such heating very high heating rates are obtained, and the size of the equipment required is substantially smaller and, correspondingly, somewhat less expensive. At the same time unusually uniform treatment in the strip may be obtained.

To avoid overheating of the strip in the event of strip stoppage, the mass of the heater is substantially reduced from that of the usual furnace structures, but it is desired also to rapidly reduce the circulating or moving gas temperature to safe temperatures. For example, if steel strip is heated to a temperature of 1200° F. in a convection gas stream which is maintained at an upper predetermined level of 1600° F., it is desirable to rapidly reduce the gas temperature to a lower predetermined temperature of about 1150 to 1200° F. or close to the desired temperature of the strip to avoid locally overheating the steel strip when the strip movement is stopped or when strip movement is slowed to a very slow pace to enable the attachment of a second strip to the end of the first-mentioned strip to allow the second strip to follow the first-mentioned strip through the heating means.

It is an object of this invention to provide an improved control system for a convection strip heater of the type described herein.

It is another object of this invention to provide an improved control system for apparatus adapted to have material passed therethrough for heating or cooling.

It is a still further object of this invention to provide an improved control system for apparatus adapted to have material passed therethrough for heating or cooling in which the speed of passage of the material through said apparatus is responsive to the temperature maintained therein.

A yet further object of this invention is to provide a speed control means for means passing a strip through a furnace in which the speed of the strip passing means is responsive to the temperatures maintained within the furnace.

The above objects are attained in the following invention by the use of apparatus which features a control system for apparatus adapted to have material pass therethrough for heating or cooling which includes means for passing the material through the apparatus, means for changing the internal temperature of the apparatus to change the temperature of the material from a first incoming level to a second desired level, and means for controlling the speed of passage of the material through the apparatus in response to the internal temperature of the apparatus. Means may be provided for setting the internal temperature changing means to selectively provide an upper predetermined temperature level and a lower predetermined temperature level within the apparatus.

More specifically there is shown herein an embodiment of the teachings of this invention which features a system for a high heat head convection heater, which includes a convection heating duct through which metal strip material can be heated as passed therethrough, a conduit for circulating gases from the outlet of the duct to the inlet of the duct, and blower means for circulating gases through the conduit and the duct. Means are provided for heating the circulating gases. Control means are provided for the heating means for setting the output temperature of the heating means at an upper predetermined level or a lower predetermined level. Conveyor means are utilized for passing the strip through the duct. Means responsive to the temperature of the circulating gases varies the speed of the conveyor means. Selective means responsive to the approach of an end of a metal strip may be utilized for selecting the lower predetermined temperature setting of the control means. The selective means may also be responsive to the positioning of a second metal strip to follow the end of the first-mentioned metal strip through the heater to select the higher predetermined temperature setting of the control means. Manual speed control means are advantageously utilized for the conveyor means to slow or stop the strip to enable the securing of a second strip to the end of the first-mentioned strip. Means for enabling the manual speed control means are responsive to the attainment of the lower predetermined temperature of the circulating gases. The manual speed control means may be disabled in response to a circulating gas temperature above the lower predetermined temperature setting.

Other objects, advantages, and features of this invention will become readily apparent when the following description is taken in conjunction with the accompanying drawings, in which:

FIGURE 1 is a schematic representation of a convection heater utilizing the teachings of this invention; and FIGURE 2 is a schematic circuit diagram of control apparatus for the convection heater illustrated in FIGURE 1.

The convection heater of FIGURE 1 comprises a heating duct 11 forming a part of a closed circuit for a convection heating stream of gas, inlet and outlet chambers 12 and 13 for strip passing through the heating duct, entrance and exit roll seals 14 and 15 to seal the atmosphere gas in the closed circuit from outside air, and a recirculating pipe or conduit 16 including therein a blower 17 and a heater 18. Strip is drawn through the heating duct 11 by conveyor or driving roll means 21 operated by a strip drive motor or motor-generator set 22. Heating gas is circulated in the heating duct and through the closed circuit by the blower, which may be a constantly operating blower.

Where flue gas forms a suitable atmosphere for the metal to be heated, as may be the case in many copper base alloys, the heater may be a direct fired type of heater, and a vent, not shown, may be provided for excess atmosphere gas. In many gases, as for example in heating steel strip, an indirect heater will be used and a specially prepared atmosphere gas will be supplied to the closed circuit by an atmosphere inlet pipe, not shown, and flue gas from the heater will be vented from vent 20.

The heater 18 may receive a mixture of fuel and air from a proportioning mixer 9 via mixture pipe 26. Fuel may be supplied to proportioning mixer 9 from fuel supply pipe 23 through a fuel valve 8, and air may be supplied to proportioning mixer 9 from air supply pipe 24 through proportioning air valve 25. A furnace control means 100 may be utilized to set the temperature output of the heater 18 at an upper predetermined temperature and a lower predetermined temperature level. The proportioning unit 9 may be a conventional proportioning mixer, not shown, such as illustrated in U.S. Patent No. 1,914,905. The zero pressure gas regulator of such mixers limits the flow of fuel from pipe 23 to a proportion of the volume passed by valve 25.

In the prior art, when moving strip was heated in high heat head apparatus, an interruption in the progress of the strip would necessarily result in overheating of the strip unless the heat head can be eliminated in sufficient time. Toward this end the heating duct 11 is usually designed for a minimum of heat storage, although it may be insulated. To provide for eliminating the heat head in the event of strip stoppage or slowing, cooling means have been provided in the closed circuit, preferably upstream of the blower. This cooling means may take the form of an air inlet damper when the metal strip being heated is not damaged thereby, as in heating aluminum strip, or it may take the form of a steam or water jet for some copper base alloys not harmed thereby. For steel it may be an indirect cooler such as an indirect water-cooled heat exchanger 32 which may be constantly cooled to avoid overheating the heat exchanger. The heat exchanger 32 may be in a bypass duct as is illustrated in U.S. Patent No. 2,479,814. It may be also desired to interrupt fuel flow to the heater 18 by closing mixer value 25 and pass only air therethrough by opening valve 44 until the circulating gas stream drops to the desired temperature. In some cases, as when heating relatively thick strip, or metal less sensitive to short overheating, it may be sufficient to cool by passing air only through the heater, especially in a direct-fired heater, and other cooling means may be dispensed with if such air can be supplied in sufficient volume. In any event the furnace control 100 is adapted to change the output temperature settings of the heater 18 between an upper predetermined temperature level and a lower predetermined temperature level in response to various means to be described hereinafter. The means for changing the heating output level of a furnace are well known to those skilled in the art and thus will not be described in detail here.

In running strip materials which are of a more delicate nature, difficulties have been encountered in the use of the convection head heaters. This invention is directed to a system for the control of a strip line, and more specifically speed control, because there are no looping towers or other places to store the material when strip rolls must be changed and the strip slowed or stopped in the furnace. The temperature must be dropped in order to avoid melting or overheating the strip. However, present equipment may not react quickly enough to effect the desired temperature drop, or the cost of such equipment may be too high. It is further desirable to slow the strip when the furnace is changing from the high heat to the low heat. The system described hereinafter not only slows the strip under these conditions but also makes allowance for the furnace either heating up or cooling down. That is, if the furnace is heating up, the strip will run slower and if the furnace is cooling the strip will run faster.

Referring to FIGURE 2 there is shown a schematic circuit diagram embodying the teachings of this invention. It will be noted that a numbered line diagram has been utilized. The components can be readily located by reference to the line number where the component is positioned. Further, contact switching operations may be noted without designating a mechanical tie between the contact and the actuating means. The contacts may be located at any convenient position, even though quite remote from their actuating means. Cross reference between the actuating means and its associated contacts is easily accomplished by noting in the right-hand margin of the drawing the reference character of the actuating means, for example CR3, a relay coil, adjacent to line 70 in FIGURE 2, the line in which contact actuating means CR3 appears. Following the reference character there are noted the line numbers in which CR3 contacts close or open when caused to do so by the actuating means, i.e. line numbers 54 and 58. It will be further noted in the reference system used herein that back contacts, that is those that open when the actuating means is energized, are noted as underlined at their position following the reference character. For example, contacts CR3 in line 58 are back contacts. Therefore the line number 58 following the CR3 character reference in line 70 is underlined to note that contact CR3 in line 58 is a back contact.

Other actuating means and their associated contacts are similarly noted. For example, the actuating coil of relay CR2 is positioned in line 75. After the reference character designation CR2 in the right-hand margin of the drawing there are noted line numbers 57, 58, and 77. This, as above, denotes CR2 contacts which will be operated in those lines upon actuation of the relay coil CR2 in line 75.

Referring to FIGURE 2 the IS1, IS2, and IS3 relays, located in lines 79 and 81, are relays which operate at the high setting on the temperature control instrument. Relays IS4, IS5, and IS6, located in lines 83 to 85, are relays which operate at the low setting on the temperature control instrument. To avoid a hunting condition in the control instrument, the system is designed so that the IS2 and IS5 relays make before the IS1 and IS6 relays.

Resistance R1 in line 56 controls the amount of decrease in speed when the furnace is heating. Resistance R3, also in line 56, controls the amount of increase in speed when the furnace is cooling. Resistance R2 is a retransmitting slide wire on the control instrument 100 which signals temperature readings to the servo amplifier 110 located in line 61. Resistance R4 in line 53 is a part of the manual speed control and is connected only when the temperature is at a predetermined low level or below. Resistance R5 is a speed limiting resistor for a manual operation and prevents the operator from running a strip too fast.

Relay CR1 in lines 67, 68 is a latch trip relay. CR1 contacts in line 57 are closed when the control instrument is changing from a low to a high temperature setting. Contacts CR1 in line 58 are closed when the control instrument is changing from a high to a low temperature setting. Relay CR2 is energized when the furnace temperature is at either the high or the low predetermined setting. When CR2 is energized, the speed change resistors at each end of the retransmitting wire are shorted out and the strip speed will be that value as set by the high or low settings at the motor generator set. Relay CR3 is located in line 70 and is energized if contacts IS4 in line 68 and auto-manual switch contacts SW1 in line 70 are closed. Closure of contacts CR3 in line 54 and the opening of contacts CR3 in line 58 transfers speed control from automatic to manual. However the system will go to automatic as soon as the temperature rises above the low set point and contacts IS4 in line 68 open. Relay CR4 is located in line 73 and is controlled by the proximity switch 120 located in line 71. As shown in FIGURE 1 the proximity switch 120 may be mounted adjacent the unrolled strip and a relay may close when a preselected number of turns remain on the coil, depending upon the thickness of the strip. Switch SW1 having contacts in lines 70 and 73 is a manual or automatic selector switch. It controls relays CR3 and CR4 in addition to the devices already controlling these relays.

The function of the various components of the apparatus will be described by going through a complete cycle of operation. Assume that the roll 7 in FIGURE 1 is approaching the end. The proximity switch 120 senses this in line 71 and is operative to deenergize relay CR4 in line 73. Front contacts CR4 in line 88 thereby open and back contacts CR4 in line 90 close. This changes the setting of furnace control 100 from a high or upper predetermined temperature output to a low predetermined temperature output. The furnace will then begin to cool. A recording arm 101 of the control 100 is responsive to the temperature of the furnace and will start moving downwardly to indicate lower temperatures. The furnace controller temperature indicator 101 may be mechanically linked to a moving arm 102 on another retransmitting slide wire R10 which may have high set points and low set points indicated thereon. Arm 102 will thus move from right to left in FIGURE 2 breaking electrical contact between contacts 103, 104, 105 and corresponding strip contacts 103a, 104a and 105a, in lines 81, 80 and 79. Relays IS1, IS2, and IS3 will thus be deenergized. The energizing and deenergizing means 102 shown in lines 79 through 85 for relays IS1 to IS6 is shown as such merely for purposes of simplicity, but any other suitable means known to those skilled in the art may also be utilized. Front contacts IS1 and IS2 in lines 75 and 77 open to deenergize relay CR2 in line 75. Front contact IS3 in line 67 opens to trip relay CR1. Contacts CR2 in lines 57 and 58 now open connecting the speed control resistors R1 and R3 in series with the retransmitting slide wire R2. However, in this case, resistor R3 will be shorted out by closed CR1 contacts in line 58 while CR1 contacts in line 57 open to keep resistor R1 in the circuit, which will cause the strip to run just a little faster to allow for the thermal head in the furnace. This will shift the voltage at the slider on the retransmitting slide wire R2 to a higher value so the strip will run just a little faster. As soon as the temperature reaches the low setting, the strip speed will be at the slow speed as set by the resistors in the motor-generator set controlling conveyor speed. The strip will continue at the preset slow speed until the operator either stops the strip or takes over manual control.

The operator cannot take control until the temperature reaches the low setting. He will lose control as soon as the temperature begins to rise again. This is accomplished by IS4 contacts in line 68 and SW1 contacts in line 70. These contacts are utilized to energize relay CR3 in line 70 to open back contacts CR3 in line 58 and close front contacts CR3 in line 54, changing speed control from retransmitting slide wire R2 to manual speed control resistor R4. When IS4 contacts in line 68 open in response to a temperature rise, relay CR3 will be deenergized and the control will revert to automatic.

Once a new roll has been positioned and connected the strip, if stopped completely, can be started again by manual control and proximity switch 120 may be again utilized to select temperature control set points energizing relay CR4 in line 73 and by the closure of contacts CR4 in line 88 and the opening of back contacts CR4 in line 90. The auto-manual switch contacts SW1 in line 73 must be closed in the automatic position so that relay CR4 in line 73 may be energized to change the temperature set points. When it is closed to an automatic position, relay CR4 will be energized and the transfer from manual to automatic control can be made. That is, speed control is now automatic because resistor R4 is disconnected and resistor R2 is connected.

As the furnace heats up, the strip should move slower than it did when the furnace was cooling. The last position of temperature was at the low and the relay CR1 was in the latch position so that resistor R1 is shorted out and the voltage at the slider of retransmitting slide wire R2 is lower so that the strip speed will be slower. As soon as the temperature reaches the high setting, CR2 will energize, closing contacts CR2 in lines 57 and 58, and the strip speed will be proportional to the temperature. The temperature and the speed will remain at these settings until the proximity switch 120 again senses the approach of an end of a roll or of a strip.

The system as disclosed hereinbefore thus includes a temperature responsive means for producing a signal proportional to the temperature of the furnace or circulating gases, the speed of the conveyor means increasing with a higher signal and decreasing with a lower signal.

As a refinement the system also includes means for producing a subtractive signal to be subtracted from the proportional signal in response to a temperature increase from the lower predetermined level to the upper predetermined level. This is accomplished by the shorting out of resistor R1 and the inclusion of resistor R3 in the circuit and causes the conveyor to increase its speed more slowly than it would in response to the proportional signal alone.

Similarly, there is provided means for producing an additive signal to be added to the proportional signal in response to a temperature decrease from the upper predetermined level to the lower predetermined level. This is accomplished by the shorting out of resistor R3 and the inclusion of resistor R1 in the circuits and causes the conveyor to decrease its speed more slowly than it would in response to the proportional signal alone.

The system allows an expanded use of high heat head convection heating apparatus and permits the elimination of looping tower or other storage means and other expensive accessories. It should be noted that the means for sensing the end or approach of an end of a strip or roll should not be limited to a proximity switch or a particular type of proximity switch since many devices suitable for this purpose are available to those skilled in the art.

In conclusion it is to be noted that the embodiment disclosed and described herein is meant to be illustrative only and not limiting in any sense. The embodiment described serves merely to illustrate the spirit and scope of the invention.

I claim:

1. A control system for apparatus adapted to have material in the form of strips passed therethrough for heating or cooling, comprising means for passing said material through said apparatus, means for changing the internal temperature of said apparatus to change the temperature of said material from a first incoming level to a second desired level, means for controlling the speed of passage of said material through said apparatus in response to said internal temperature, means for setting said internal temperature changing means to selectively provide an upper predetermined temperature level and a lower predetermined temperature level within said apparatus, the temperature within said apparatus changing from one level to the other level over a period of time in response to the selection of said other level, means for sensing the approach of an end of a strip and a selective means responsive to said sensing means for selecting one of said upper and lower predetermined temperature levels.

2. A system as defined in claim 1 in which the change in internal temperature of said apparatus after a predetermined temperature level selection in response to the approach of an end of a strip is in a direction to slow the passage of said strip.

3. A system for a high heat head convection heater, which comprises the combination of a convection heating duct, through which metal strip material to be heated is passed; a conduit for circulating gases from the outlet of the duct to the inlet of the duct; blower means for circulating gases through the conduit and the duct; means for heating said circulating gases; control means for said heating means for setting the output temperature of said heating means at an upper predetermined level or a lower predetermined level; conveyor means for passing said strip through said duct; means responsive to the temperature of said circulating gases for varying the speed of said conveyor means; and selective means responsive to the approach of an end of a metal strip for selecting said lower predetermined temperature setting of said control means.

4. A system as defined in claim 3 in which said temperature responsive means includes means for producing a signal proportional to the temperature of said gases, the speed of said conveyor means increasing with a higher signal and decreasing with a lower signal, and means for producing a subtractive signal to be subtracted from said proportional signal in response to a temperature increase from said lower predetermined level to said upper predetermined level, thereby causing said conveyor means to increase its speed more slowly than it would in response to said proportional signal alone.

5. A system as defined in claim 3 in which said selective means is responsive to the positioning of a second metal strip to follow the end of said first-mentioned metal strip through said heater to select said higher predetermined temperature setting of said control means.

6. A system as defined in claim 5 in which said selective means is a proximity switch operative to sense the approach of an end of said first strip and sense the addition of a second strip to the end of said first strip.

7. A system as defined in claim 3 which further includes manual speed control means for said conveyor means and means for disabling said manual speed control means in response to said circulating gases attaining said lower predetermined temperature, said manual speed control means enabling said strip to be slowed or stopped for attachment of a second strip to the end of said first-mentioned strip.

8. A system as defined in claim 7 which further includes means for disabling said manual speed control means in response to a circulating gas temperature above said lower predetermined temperature setting.

9. A control system for heating apparatus adapted to have material passed therethrough for heating; comprising means for passing said material through said apparatus, means for supplying heat to the interior of said apparatus, means for controlling the speed of passage of said material through said apparatus in response to the amount of heat being absorbed by said material, means for setting said heat supply means to selectively provide a predetermined high temperature and a predetermined lower temperature, the temperature within said apparatus changing from one predetermined temperature to the other over a period of time in response to a selection of said other predetermined temperature, said material being fed through said apparatus in strip form, and means for selecting said lower predetermined temperature in response to the approach of an end of a strip.

10. A system as defined in claim 9 which further includes manual speed control means and means for enabling said manual speed control means in response to the attaining of said predetermined lower temperature within said apparatus.

11. A system as defined in claim 10 which further includes means for disabling said manual speed control means in response to a temperature above said predetermined lower temperature.

12. A system as defined in claim 9 which further includes means for selecting said higher predetermined temperature in response to the securing of a beginning of a second strip to follow the end of said first-mentioned strip through said apparatus.

13. A control system for heating apparatus adapted to have material passed therethrough for heating; comprising means for passing said material through said apparatus, means for supplying heat to the interior of said apparatus, means for controlling the speed of passage of said material through said apparatus in response to the amount of heat being absorbed by said material, means for setting said heat supply means to selectively provide a predetermined high temperature and a predetermined lower temperature, the temperature within said apparatus changing from one predetermined temperature to the other over a period of time in response to a selection of said other predetermined temperature, and means for selecting said higher predetermined temperature in response to the positioning of material to be passed through said apparatus.

14. A system for a high heat head convection heater, which comprises the combination of a convection heating duct, through which metal strip material to be heated is passed; a conduit for circulating gases from the outlet of the duct to the inlet of the duct; blower means for circulating gases through the conduit and the duct; means for heating said circulating gases; control means for said heating means for setting the output temperature of said heating means at an upper predetermined level or a lower predetermined level; conveyor means for passing said strip through said duct; means responsive to the temperature of said circulating gases for varying the speed of said conveyor means, said temperature responsive means further includes means for producing a signal proportional to the temperature of said gases, the speed of said conveyor means increasing with a higher signal and decreasing with a lower signal, and means for producing an additive signal to be added to said proportional signal in response to a temperature decrease from said upper predetermined level to said lower predetermined level, thereby causing said conveyor means to decrease its speed more slowly than it would in response to said proportional signal alone.

References Cited

UNITED STATES PATENTS

| | | | |
|---|---|---|---|
| 2,205,182 | 6/1940 | Whitten | 236—15 X |
| 2,518,905 | 8/1950 | Kniveton | 263—3 |
| 2,664,283 | 12/1953 | Hess et al. | 236—15 X |
| 2,668,701 | 2/1954 | Dietrich | 263—3 |
| 2,942,352 | 6/1960 | Eicken-Esteinne | 34—52 |
| 2,991,989 | 7/1961 | Martin | 263—3 |
| 3,259,995 | 7/1966 | Powischill | 34—52 X |

JAMES W. WESTHAVER, *Primary Examiner.*

FREDERICK L. MATTESON, JR., *Examiner.*

D. A. TAMBURRO, *Assistant Examiner.*